US008831624B2

(12) United States Patent
    Chandrasekaran

(10) Patent No.: US 8,831,624 B2
(45) Date of Patent: Sep. 9, 2014

(54) BACK-CHANNELED PACKETED DATA

(75) Inventor: Anand Chandrasekaran, San Jose, CA (US)

(73) Assignee: Unwired Planet, LLC, Reno, NV (US)

( * ) Notice: Subject to any disclaimer, the term of this patent is extended or adjusted under 35 U.S.C. 154(b) by 530 days.

(21) Appl. No.: 12/914,838

(22) Filed: Oct. 28, 2010

(65) Prior Publication Data

US 2011/0105077 A1    May 5, 2011

Related U.S. Application Data

(60) Provisional application No. 61/256,565, filed on Oct. 30, 2009.

(51) Int. Cl.
    *H04M 3/00* (2006.01)
    *H04W 4/00* (2009.01)
    *H04W 72/00* (2009.01)
    *H04B 7/00* (2006.01)

(52) U.S. Cl.
    USPC ........ 455/453; 455/418; 455/432.3; 455/450; 455/452.2; 455/509

(58) Field of Classification Search
    USPC ........... 455/405–406, 410, 404.1, 414.3, 415, 455/418–420, 432.3, 434, 445, 455/456.1–456.3, 456.2, 466, 500, 514, 455/550.1, 552.1, 556.2, 557, 560–561, 455/432.1, 450, 452.1–452.2, 453, 457, 455/456.5–456.6, 509; 380/28–29, 57, 380/247–250; 701/482–491, 516–517, 526, 701/537–538, 540–541; 707/781–785, 812; 370/234, 255, 310, 338, 395.2, 395.21, 370/395.32, 395.5, 395.52, 400–402, 230, 370/230.1, 237, 252–253, 328–329, 341, 370/348, 462, 913; 709/203, 206, 218–219, 709/228–229
    See application file for complete search history.

(56) References Cited

U.S. PATENT DOCUMENTS 6,202,068 B1    3/2001  Kraay et al.
6,640,284 B1 *  10/2003 Shaw et al. .................. 711/129
(Continued)

FOREIGN PATENT DOCUMENTS

WO    2007048063 A2    4/2007

OTHER PUBLICATIONS

International Search Report and the Written Opinion, Dec. 27, 2010, PCT/US2010/054767, p. 1-21.

(Continued)

*Primary Examiner* — Meless Zewdu

(57) ABSTRACT

A processor node stores and processes the last known location for certain mobile terminals to provide intermediate back-channel data in a form that is a function of whether the intermediate back-channel data is to be used in a situation that would encroach on information that might be sensitive to the subscriber or user of the mobile terminal, as viewed contractually, ethically or otherwise. If, for example, the subscriber or user of the mobile terminal has no such concerns (rights have been waived voluntarily by agreement with the wireless network operator or a third party, or involuntarily such as by a government mandate), the processor node generates location-identity-based back-channel data in a form that does not attempt to hide or code the user's identity and/or specific location. This form of (nonanonymized) data can be freely used internally by processor nodes internal to the wireless carrier as well as produced for review and analysis, such as demographic analytics, for use by a third party. Further, it is possible that this information can include other information from the user profile and/or the contract information used to permit the mobile terminal access to the network.

24 Claims, 7 Drawing Sheets

(56) References Cited

U.S. PATENT DOCUMENTS

| | | | |
|---|---|---|---|
| 6,871,287 B1 | 3/2005 | Ellingson | |
| 7,457,608 B2* | 11/2008 | Shah | 455/351 |
| 7,496,191 B1* | 2/2009 | Crews et al. | 379/220.01 |
| 7,519,470 B2* | 4/2009 | Brasche et al. | 701/457 |
| 7,606,790 B2 | 10/2009 | Levy | |
| 7,899,706 B1 | 3/2011 | Stone et al. | |
| 8,223,938 B2* | 7/2012 | Cassanova et al. | 379/142.06 |
| 2001/0036224 A1 | 11/2001 | Demello et al. | |
| 2001/0056374 A1 | 12/2001 | Joao | |
| 2002/0019873 A1* | 2/2002 | Goldszmidt et al. | 709/228 |
| 2002/0022488 A1 | 2/2002 | Srinivasan et al. | |
| 2002/0035605 A1 | 3/2002 | McDowell et al. | |
| 2002/0049840 A1* | 4/2002 | Squire et al. | 709/225 |
| 2002/0067818 A1* | 6/2002 | Barathan et al. | 379/219 |
| 2002/0099785 A1 | 7/2002 | Teeple | |
| 2002/0111172 A1* | 8/2002 | DeWolf et al. | 455/456 |
| 2002/0128908 A1 | 9/2002 | Levin et al. | |
| 2002/0173296 A1 | 11/2002 | Nordman et al. | |
| 2003/0097451 A1 | 5/2003 | Bjorksten et al. | |
| 2003/0130893 A1 | 7/2003 | Farmer | |
| 2003/0145038 A1 | 7/2003 | Tariq et al. | |
| 2003/0204613 A1 | 10/2003 | Hudson et al. | |
| 2004/0017310 A1* | 1/2004 | Vargas-Hurlston et al. | 342/357.1 |
| 2004/0078293 A1 | 4/2004 | Iverson et al. | |
| 2004/0098748 A1 | 5/2004 | Bo et al. | |
| 2004/0122730 A1 | 6/2004 | Tucciarone et al. | |
| 2004/0137886 A1* | 7/2004 | Ross et al. | 455/414.1 |
| 2005/0027798 A1* | 2/2005 | Chiou et al. | 709/203 |
| 2005/0043989 A1 | 2/2005 | Shifrin | |
| 2005/0096975 A1 | 5/2005 | Moshe | |
| 2005/0124369 A1 | 6/2005 | Attar et al. | |
| 2005/0165738 A1 | 7/2005 | Lancefield | |
| 2005/0166072 A1 | 7/2005 | Converse et al. | |
| 2005/0215238 A1 | 9/2005 | Macaluso | |
| 2005/0228860 A1* | 10/2005 | Hamynen et al. | 709/203 |
| 2006/0168111 A1 | 7/2006 | Gidwani | |
| 2006/0189326 A1* | 8/2006 | Black et al. | 455/456.1 |
| 2007/0026871 A1 | 2/2007 | Wager | |
| 2007/0037605 A1 | 2/2007 | Logan | |
| 2007/0133405 A1 | 6/2007 | Bowra et al. | |
| 2007/0264968 A1 | 11/2007 | Frank et al. | |
| 2007/0270161 A1* | 11/2007 | Hampel et al. | 455/456.1 |
| 2007/0274499 A1 | 11/2007 | Bennett | |
| 2007/0280462 A1 | 12/2007 | Neece | |
| 2007/0287473 A1 | 12/2007 | Dupray | |
| 2007/0294722 A1 | 12/2007 | Kang et al. | |
| 2008/0004954 A1* | 1/2008 | Horvitz | 705/14 |
| 2008/0070550 A1* | 3/2008 | Hose | 455/411 |
| 2008/0103984 A1 | 5/2008 | Choe et al. | |
| 2008/0114829 A1* | 5/2008 | Button et al. | 709/203 |
| 2008/0133830 A1 | 6/2008 | Nitta et al. | |
| 2008/0140650 A1* | 6/2008 | Stackpole | 707/5 |
| 2008/0171559 A1 | 7/2008 | Frank et al. | |
| 2008/0176713 A1 | 7/2008 | Olivera Brizzio et al. | |
| 2008/0177647 A1* | 7/2008 | Veenstra | 705/34 |
| 2008/0214151 A1 | 9/2008 | Ramer et al. | |
| 2008/0214156 A1 | 9/2008 | Ramer et al. | |
| 2008/0224862 A1 | 9/2008 | Cirker | |
| 2008/0235351 A1* | 9/2008 | Banga et al. | 709/218 |
| 2008/0248815 A1 | 10/2008 | Busch | |
| 2008/0256059 A1 | 10/2008 | Chang et al. | |
| 2008/0271072 A1* | 10/2008 | Rothschild et al. | 725/35 |
| 2009/0094377 A1 | 4/2009 | Zahavi et al. | |
| 2009/0138445 A1 | 5/2009 | White et al. | |
| 2009/0157834 A1 | 6/2009 | Krishnaswamy | |
| 2009/0160673 A1 | 6/2009 | Cirker | |
| 2009/0196218 A1 | 8/2009 | Pulini et al. | |
| 2009/0210631 A1 | 8/2009 | Bosworth et al. | |
| 2009/0247193 A1* | 10/2009 | Kalavade | 455/456.3 |
| 2009/0253419 A1 | 10/2009 | Phillips | |
| 2009/0254657 A1 | 10/2009 | Melnyk et al. | |
| 2010/0015991 A1 | 1/2010 | Evans et al. | |
| 2010/0034089 A1 | 2/2010 | Kovvali et al. | |
| 2010/0034218 A1 | 2/2010 | Kovvali et al. | |
| 2010/0057883 A1 | 3/2010 | Cao et al. | |
| 2010/0085947 A1* | 4/2010 | Ringland et al. | 370/338 |
| 2010/0158026 A1 | 6/2010 | Valmikam et al. | |
| 2010/0267403 A1* | 10/2010 | Lungaro et al. | 455/466 |
| 2010/0325127 A1* | 12/2010 | Chaudhuri et al. | 707/759 |
| 2010/0332586 A1* | 12/2010 | Jogand-Coulomb et al. | 709/203 |
| 2011/0159887 A1 | 6/2011 | Lohtia et al. | |

OTHER PUBLICATIONS

Enhua Tan, Lei Guo, Songqing Chen, and Xiaodong Zhang, "SCAP: Smart Caching in Wireless Access Points to Improve P2P Streaming", Proceedings of the 27th International Conference on Distributed Computing Systems (IEEE ICDCS 2007), Toronto, Canada, Jun. 25-29, 2007.

Alex Zambelli, "IIS Smooth Streaming Technical Overview", Windows Server Internet Information Services 7.0, Microsoft Corporation, Mar. 2009.

R. Pantos, Ed., "HTTP Live Streaming", Informational Internet-Draft, Apple, Inc., Jun. 8, 2009.

Urs Niesen, Devavrat Shah, Gregory Wornell, "Caching in Wireless Networks", Aug. 13, 2009.

* cited by examiner

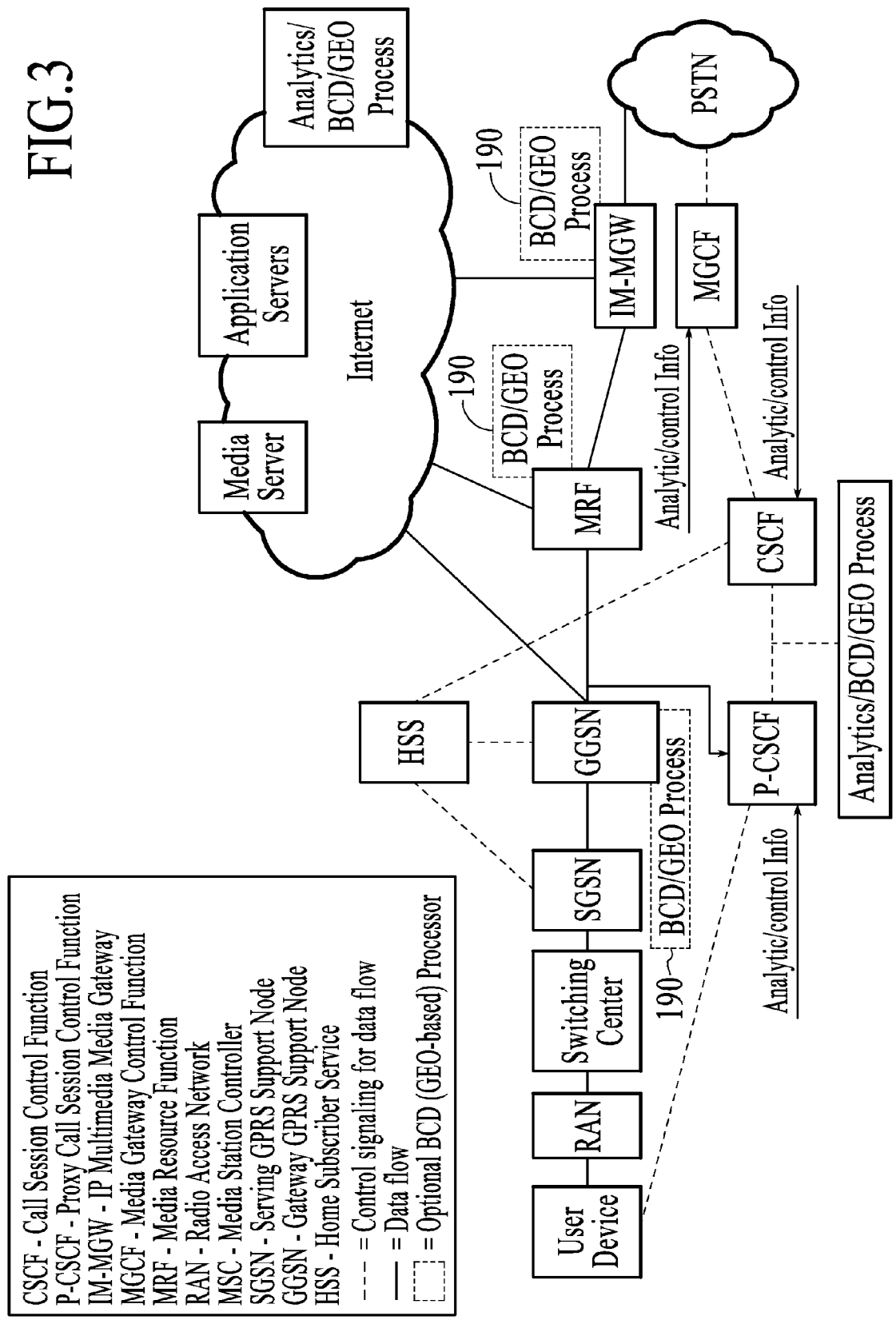

BACK-CHANNELED PACKETED DATA

RELATED PATENT DOCUMENTS

This patent document claims the benefit, under 35 U.S.C. §119(e), of U.S. Provisional Patent Application Ser. No. 61/256,565 filed on Oct. 30, 2009, and entitled "Back-Channeled Packeted Data;" this patent document is fully incorporated herein by reference.

FIELD OF THE DISCLOSURE

The present disclosure is related to computers, communication networks and the use of traffic data in a communication network having network elements that are implemented with wireless technology. Aspects of the disclosure relate to location-indicative information provided on behalf of terminals and used in such a communication network.

BACKGROUND

Communication networks continue to improve in their abilities to efficiently and practically assist terminal-equipment users and society in general in communicating information, such as voice signals, images, electronic files or data, and video signals, to and from a mobile communication device using radio waves. For example, a wireless communication network may include a communication system using one or more of various radio-communication schemes such as represented in recent implementations and proposals of digital (e.g., 3G/4G) cellular, wireless peer-peer, PCS and satellite communication systems.

Wireless communication networks generally include a network of base stations that communicate with various wireless communication devices. Examples of wireless communication devices include telephony devices, wireless readers, radios, personal digital assistants (PDAs), palmtops, notebook computers, and other devices that have wireless communication capability. Each base station provides communication services within its respective network zone, such that the network of base stations provides a number of network zones that can cover a large geographic area. The network zones and their respective coverage areas occasionally change as base stations are improved and added within the wireless communication network. Nearly all of the United States is covered by cellular communication networks, with many of the base stations now providing various forms of the above-mentioned communication systems.

More recently, a number of location-based service applications have been implemented or proposed for wireless communication networks. Examples of such existing or proposed location-based service applications include: emergency service, location-dependent call routing, location-dependent billing, location tracking, and the like. In emergency applications the call and the exact location of the wireless communication device may be routed to the closest provider of emergency services, thus reducing emergency response time and possibly saving lives. In location-dependent billing applications, different billing rates may be charged to a customer for operating the wireless communication device in different geographical areas. Each location-based service application utilizes the location of the wireless communication device.

Location systems sometimes utilize conventional system reference location methods for determining or characterizing the location of the wireless communication device. Such reference location methods operate by relating the location of the wireless communication device to a network zone, e.g., cell or cell sector of the wireless communication network. However, mobile operators face specific and real problems with network resources that may hinder widespread deployment of commercial location-based services. For example, consider a situation where a mobile operator is offering a mix of location-based services to its subscribers. The application mix includes services like fleet tracking, child finder, push advertising, and traffic alerts. These applications generally would like to be notified with location updates when the subscriber is moving, and perhaps with greater frequency when the subscriber is moving more rapidly.

Aspects of the present disclosure can be useful for addressing these various needs and for providing various advantages and uses of location-based information in networks involving mobile terminals. While the present disclosure is not necessarily limited to such aspects, the instant disclosure may be appreciated through a discussion of examples using these and other contexts.

SUMMARY

Without limitation, aspects of the present disclosure are directed to various embodiments involving back-channel location-based data available to an operator of the wireless network. Some of these aspects are: 1) architectural aspects of wireless communication networks for routing and processing location-based mobile-terminal data within the network; 2) routing and processing location-based mobile-terminal data by a wireless communication network in cooperation with a local or hot-spot network; 3) processing location-based mobile-terminal data by a wireless communication network for controlling aspects of mobile terminals; 4) Mobile terminal operation based on input from a wireless communication network processing location-based mobile-terminal data; 5) a wireless communication network adapted for routing and processing location-based mobile-terminal data to monitor (suspicious) calls; 6) providing telephony terminals network access (e.g., call-screening) on behalf of $3^{rd}$ parties; 7) a wireless communication network adapted for using and processing location-based mobile-terminal data as (geo-tagged) information sources for third parties and adaptively reprocessing such location-based data within the network with third party applications; and 8) software-based (business) methodology involving income-producing business models.

Using one or more of the above-described architectures or network arrangements, the processor node stores and processes the last known location for certain mobile terminals to provide intermediate back-channel data in a form that is a function of whether the intermediate back-channel data is to be used in a situation that would encroach on information that might be sensitive to the subscriber or user of the mobile terminal, as viewed contractually, ethically or otherwise. If, for example, the subscriber or user of the mobile terminal has no such concerns (rights have been waived voluntarily by agreement with the wireless network operator or a third party, or involuntarily such as by a government mandate), the processor node generates location-identity-based back-channel data in a form that does not attempt to hide or code the user's identity and/or specific location. This form of (nonanonymized) data can be freely used internally by processor nodes internal to the wireless carrier as well as produced for review and analysis, such as demographic analytics, for use by a third party. Further, it is possible that this information can include other information from the user profile and/or the contract information used to permit the mobile terminal access to the network.

If the subscriber or user of the mobile terminal has or is presumed to have such concerns, the processor node generates location-identity-based back-channel data in a form that hides (coding or encryption) or removes the user's identity and/or specific location. Based on subsequent uses of the data, its form is anonymized relative to the user's identity, e.g., by use of a token (#954) which categorizes the user's identity in demographic terms. The anonymized data is then relatively freely used internally and/or produced for external review and analysis as discussed herein and above.

In yet another related embodiment involving subscribers or users of the mobile terminals with at least presumptive identity concerns, the operator of the wireless network establishes its agreements for access to the network by way of the generalized or hidden identity of the mobile users. A pay-as-you-use mobile terminal is one example. In this example, the issuer of the mobile terminal effectively leases the terminal based on an agreement between the issuer and the operator of the wireless carrier; in this manner the ultimate user of the mobile terminal is removed or hidden from the operator of the wireless carrier, thereby permitting the latter relative freedom to use the intermediate back channel data. An encrypted-identity subscription agreement is another related example, in which the user's identity is expressly hidden by agreement between the subscriber-user of the mobile terminal and the operator the wireless network.

Other related applications for use of the intermediate back channel data include emergency service, location-dependent call routing, location-dependent billing, location tracking, fleet tracking, push advertising, traffic alerts, driving directions, child finder, and friend finder.

In a more specific embodiment, another aspect is directed to a communication network having wireless-technology equipment that includes a memory circuit for storing on behalf of an operator for the communication network, user profiles that include wireless network subscriber data useful for providing network access to user terminals associated with the subscriber data, and also algorithms defining executable processes. A processor node is configured within the wireless-technology equipment for accessing the stored data, for assimilating current location data regarding the user terminals with the user profiles, for retrieving data from the assimilated current location data, and for selecting and executing one of the algorithms. In response thereto, the processor node produces data sets for analysis by a third party, for sending the produced data sets to a third party, and as a function of the algorithm(s), generates a set of invoice data for payment on behalf of the third party.

In another more specific embodiment, the wireless network is used as part of an anonymous bidding system that allows bidders to participate in a live auction by placing bids for items, but that does not disclose the identity of the bidding parties. Bidding participants use mobile terminals as bidding devices and they receive auction-related information such as item description, asking price, current high bid and time left, through their mobile terminals. The processor, internal to the wireless network, tracks messages for the participants using the intermediate back channel data, and processes bid requests via tokens which anonymize the participant's identity. As the mobile terminal provides an authenticable source, particularly with the related location-access point for the bid being part of intermediate back channel data, this embodiment provides an advantageous tool for controlling and auditing such bidding/auction processes.

In related embodiments, the processor node stores and retains the last known location for recall in an authorized situation such as providing a more secure authentication for accessing a communication channel. In such contexts, the processor node authenticates in real time, or stores data for later reporting, user identity by recording the user's mobile-identification information with the location-access point as part of an authorization subscriber protocol and/or another authorized procedure. As an example, such secure authentication involves a secure logon to a site via a wireless network channel where the logon requires access from a pin-pointed location, e.g., in front of a video camera, at a bank or designated type of machine such as ATM or an RFID-enabled device that provides further protocols. Look-up tables (internally or externally provided) can be used to present the processor node convenient cache-like access to the authorized location-access points on a user-profile basis, as well as convenient billing codes for generating invoicing data should the subscriber profile indicate that payment is to be provided for also operating the processor node to block/monitor/report unauthorized access attempts.

Certain protocols and/or authorized procedures are carried out based upon an entity or individual that is issuing such a mobile terminal to a particular user, such as when a parent or business owner issues a mobile terminal to a child or employee. The processor node restricts access, and provides communications limitations such as controlling (screening, blocking, recording, and/or summarizing) communications with particular endpoint devices, or involving any emails, email attachments, certain social sites, video streaming and other forms of messages, during times when the user is expected to be at specified locations or at unspecified locations other than those specified in the network's protocol-procedure documentation, or where such communications are deemed by the network's protocol-procedure documentation to be inappropriate (while school is in session, business hours, during safety training or other important events, while couriers are delivering goods, etc.).

According to other embodiments, back channel data is processed by a processor node internal to the wireless network as geo-based information sources accessible by third parties. With reference to the user profiles and anonymization rules stored in a memory accessible to the processor node, the processor node anonymizes the user's identity before publishing for third parties. The anonymization rules are established and paid for use thereof by third parties on a party-by-party basis in certain specific embodiments.

In other certain specific embodiments, the anonymization rules are pre-established using a set of rules that is generically usable by different third parties. In more specific embodiments thereof, the processor node uses different algorithms and queries the third parties for parameters that feed or drive the algorithms. As examples, one set of algorithms is directed to analytics pertaining to certain demographics, e.g., growth of video-based messages over wireless networks by mobile terminals registered for those born after 1990 and before the year "X", and in cities having populations over "Y"; third parties would select the appropriate algorithm in such a set of related algorithms and input the data for "X" and "Y" (along with other limited parameters such as time frames). Another set of algorithms pertains to a retail sales approach in which retailers are attempting to track trends in regions (rural and suburban areas) for smart-phone e-commerce hits through (e.g., the top few) social websites, with URLs for the social websites and zip codes or city names for the targeted regions being input parameters. As above, a third party can request that the same or other algorithms reprocess the initially-processed information.

BRIEF DESCRIPTION OF THE FIGURES

FIG. 3 depicts an example wireless network consistent with various cellular systems and embodiments of the present disclosure.

DETAILED DESCRIPTION

Figure 1A:
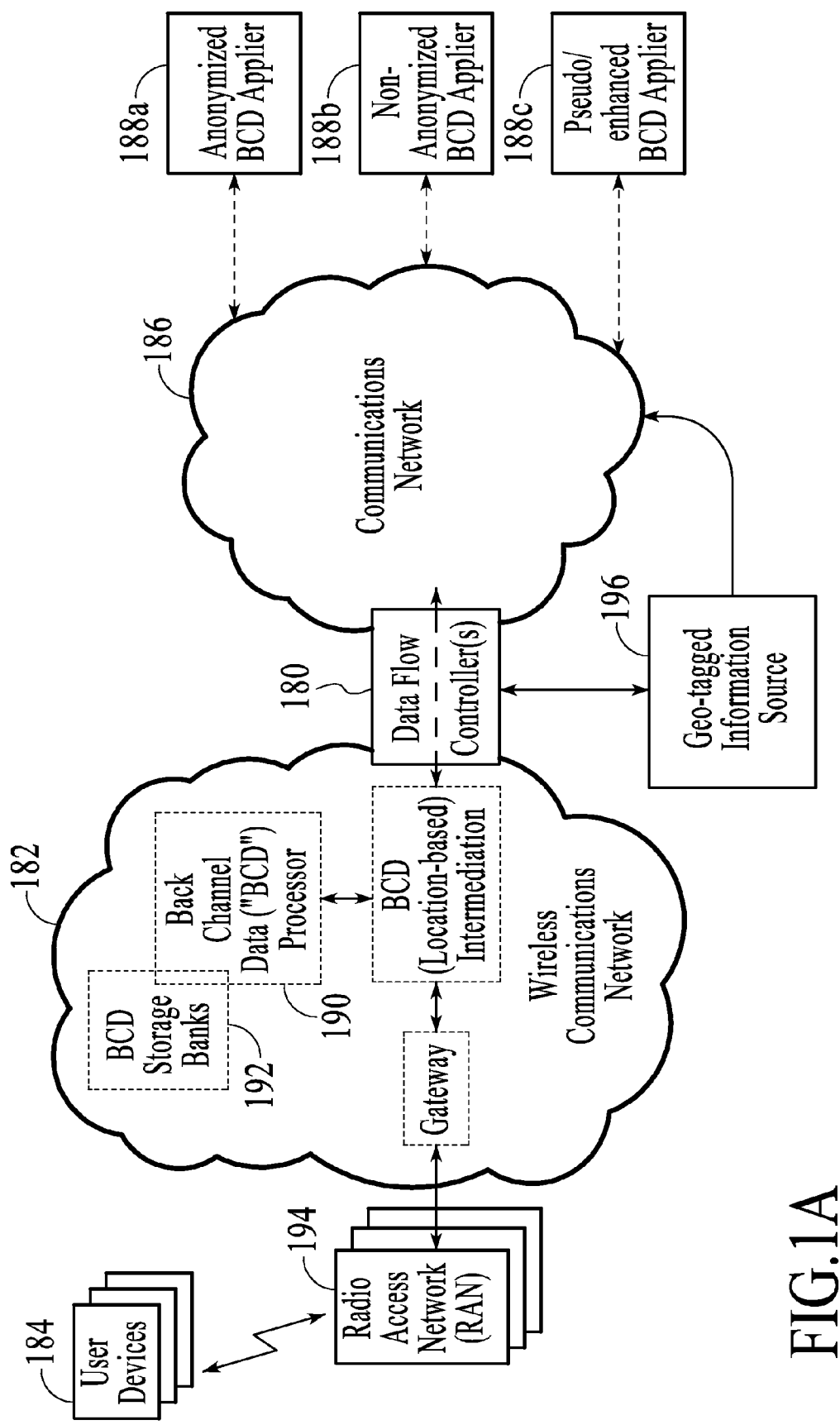
FIG. 1A depicts a block diagram of a system and various configurations optionally involving external data-processing/data-access nodes, consistent with embodiments of the present disclosure.

In accordance with various example embodiments, a wireless data/communication network includes access networks in multiple geographies interconnected by a core network, where the wireless data network includes one or more specially-configured processor modules (herein referred to as processor nodes) that operate on location-based data and user profile data as this type of data is developed and/or passed along the channels of the network. While not necessarily limited thereto, aspects of the present disclosure are directed to uses of this type of data, referred to herein as back channel data.

The location-based data can be developed upon registration of the mobile terminals which occurs through the radio-access equipment, such as base stations and, in certain configurations and in addition to or in lieu of, the location of the mobile terminal is refined or provided by another device such as by the mobile terminal pushing its GPS location to the wireless network or by the above-mentioned processor node assimilating the mobile terminal's communication history (e.g., last-known GPS coordinates and/or last linked-to WiFi server).

The user profile data is largely pre-stored in the wireless network based on contractual rights implemented before the user gains access the wireless network. These contractual rights specify the identity of the mobile terminal and other miscellaneous information which is useful for the user of the mobile terminal, for the operator of the wireless network as well as for certain third parties. For example, a SIM-type card can contain one or more unique serial numbers for the mobile user, security authentication and ciphering information, temporary information related to the local network such as a temporary local identification number that has been issued to the user, certain passwords and a list of the user-accessible services made available by the wireless network to the user. This information, referred to as user-profile data, is retrieved and processed by the above-mentioned processor nodes, in channels of wireless network channels for the user to communicate.

Aspects of the present disclosure are useful in a variety of communications networks. As an example, such communications networks may include a wireless network and another local or periphery-region network, where the wireless network has such a processor node operating on back channel data and where the local or periphery-region network includes a wireless link (e.g., in the last mile of the network) connecting user client devices to a radio transceiver with additional core network elements connecting the access network to the Internet backbone. The core network may employ wired or wireless technologies or a combination thereof. In a particular implementation, the access network includes a femtocell that acts as the access network's transceiver with a user's broadband connection acting as the backhaul link to the core network and the Internet backbone. In another implementation, the access network is terminated by a wireless WAN router that has one or more client devices connected to it over a wired connection (e.g., 3G router) or a wireless connection (e.g., 3G WiFi router). The access and core networks together can be operated by a wireless service provider that manages the network and charges users for the service.

Aspects of the present disclosure relate to use of processor nodes within the wireless network that are configured to provide specialized information, drawing from the back channel data, to the user of the mobile terminal, to the operator of the wireless network and to certain third parties which may be charged for the services relying on the special information. For example, these specialized services can be provided to an operator of the wireless network to provide location-based, user-profile based detailed analytics for performing optimizations of the data traffic in a wireless network by (re)routing in a proactive/predictive manner or reactively based on dynamics learned while users are accessing the network. As the wireless network is aware of its own capabilities for handling data flow, such as where a cache memory might be available at a periphery region of the network about to be congested by a myriad of users (e.g., a breaking event drawing crowds to a region and to news-related web pages characterizing the event), communication between its specialized processor nodes can exploit this back channel data by delivering redundantly-requested content from the cache rather than from a resource on the other side of the network. Similarly, another set of related back channel data, e.g., pertaining to the number and age groups of people suddenly appearing at the event, can be processed by the processor node(s) and published as geographically-tagged information for third parties.

Turning now to the figures, FIG. 1A depicts a block diagram for a data control module within a communication system, consistent with embodiments of the present disclosure. A data flow controller 180 controls the flow of data between user devices 184 and content providers (or databases) 188a-188c. User devices 184 (also referred to as user terminals, user equipment, user devices, mobile stations, mobile devices, mobile terminals, mobile equipment) can be wirelessly connected to the data flow controller through a communications network 182 (examples of suitable networks are provided herein). Content providers can be connected to the data flow controller through a communications network 186 (e.g., a wired/wireless, public/private packet-enabled network). Communication involving user devices 184 includes wireless communication via radio access network (RAN)

equipment 194 which partly defines the wireless network part of the communication system.

Using the RAN equipment 194, user devices 184 can request content from a variety of sources including for example, website providers, servers, and other user devices which can be individual endpoint devices, such as smart phones which can also be content providers for another smart phone. One of more specialized processor nodes 190 (with designated memory circuits 192) are selectively incorporated into the network at one or many locations and are communicatively coupled to the access channels provided via the RAN equipment 194. From these access channels, the processor nodes 190 are programmed to look for and intercept location-based data and related user profile data for specialized operations.

In other embodiments, the processor nodes are programmed to access (receive from and/or write to) databases internal to the wireless network such as a 3G/4G cellular network. As permitted and enabled by way of other specialized resources such as those paid for by third parties, databases external to the wireless network are also available. FIG. 1A illustrates a database 196 which is depicted labeled as a "geo-tagged" information source because, in the example, the processor node 190 has stored therein location-based back channel data regarding the locations of certain user devices. In certain example applications, the database 196 can be implemented external to the wireless network for review and processing by third parties, and can be implemented internal to the wireless network for review and processing by an operator of the wireless network.

Using the specific application where the database 196 is implemented external to the wireless network, management of the data accesses by a third party can be controlled by the same or different processor nodes processing the data to protect the user's identity and other confidential information which is at least initially present in the form of back channel data. This privacy is maintained through the use of "tokens" in place of such confidential user information, sometimes referred to as "anonymizing" certain back channel data.

FIG. 1A illustrates databases 188a-188c as providing or using a form of the back channel data. Database 188a contains certain anonymized back channel data. Database 188b contains certain back channel data that is not anonymized, e.g., for applications internal to the wireless network. Database 188c contains pseudo-anonymized back channel data which is demographically enhanced to hide highly-sensitive information such as the user's identity while providing significant other information to characterize the user and/or the user's behavior insofar as such appropriate information is procured, in various ways, by the processor node(s) via the wireless network.

Related embodiments and applications involve different aspects and applications certain back channel data, as discussed in more detail herein.

As one aspect of the disclosure relates to the specialized use of back channel data for managing the flow of data in the network (or data traffic control), use of the specialized processor nodes can become integral with other network processing elements used in the wireless network. For instance, based on expectations of increased or decreased types of users in a certain region, data that is being uploaded through the network to a website or service may be blocked, expedited, delayed or throttled. Blocking traffic disrupts the user activity driving the network usage and forces the responsibility of handling the network connectivity interruption on the user or the user's application/service. Blocking may be accomplished by terminating a request for TCP connection. Delaying traffic postpones data traffic to a future time. This may be motivated by congestion in the network at a given time or by operator defined policies. Delaying may be accomplished by blocking initial requests for communication followed by allowing the communication to proceed at a later time based on pre-defined policies or observed increase in network availability. Throttling slows down traffic in a network allowing the user to continue use of the network but at a reduced throughput. Throttling may be accomplished by delaying the transmission of TCP SYN packets in the case of a TCP/IP network effectively simulating a lower available bandwidth. Blocking, delaying and throttling may be implemented using a combination of client device and network element functionality. The client device component of the functionality may be implemented with a native client resident on the client device or an embedded client delivered as part of the data stream for execution in a browser environment. As users often become network frustrated in congested times (limited access when the user leaves work in an urban area at the end of the day or leaving a large public event in a frequented area), the user profiles can include a paid-for expedited-communication service which the specialized processor nodes can access and utilize for the user when the back channel data indicates that the user is in that region and, optionally, at such times.

Data flow controller(s) 180 of FIG. 1A can provide various location-related functions useful for controlling and providing delivery of content to user devices 184. An example of such functions is limiting access to the content based on where one or more user devices 184 are located. Access can be limited in a number of different manners including, for example, denial of content, denial of a form of content (e.g., voice, email, mms or short message), and delay in providing the content, and/or throttling of the speed at which the content is provided. The selection and implementation of these functions can be effected by monitoring, for certain user devices in certain locations, a number of context parameters including, for instance, parameters that define the current state of the network. This allows for data flow controller 180 to actively respond to changing network conditions and facilitate control over and allow for fair use of bandwidth between content providers and/or for critical content or services to remain available.

The implementation of data flow controller 180 can take several forms and may involve using two or more such controllers 180. In this context, the network items 182 and 194 are merely two aspects generally characterizing a potential larger network system, perhaps with other data flow controllers distributed near the periphery of the network system, e.g., near the initial connection point of user devices 184. Each data flow controller 180 can monitor and assess network loading, content overuse and similar parameters (discussed in more detail herein). This can be particularly useful for providing data flow control that is tailored toward a particular data path. For instance, content can be device specific, geographically specific, language specific or otherwise tend to be unevenly accessed between different users. Thus, one data flow controller may see a very high rate of content access whereas another data flow controller sees very low rate of content access.

In such contexts, monitoring and controlling data flow as a function of location-based data regarding user devices 184 can be advantageous. Certain implementations use one or more centralized analysis devices to provide location-based content control indicators to data flow controllers 180 for assessing and predicting content accesses across different data paths. In certain embodiments discussed in this disclosure, cache storage devices can be implemented for caching content as a function of location-based back channel data, an example of which is use of a cache for a category of communications to and from a designated group of mobile terminals heading to a large sporting event. As discussed in connection with the data flow controllers 180, the location, control and usage of the cache storage devices can be implemented largely based on predictive analysis of location-based data regarding user devices 184.

In a related example, news professionals, safety/medical personnel, government officials and certain businesses may require priority access to the wireless network in times involving special public situations where large crowds gather, whether a newsworthy event, a business convention or a potential public catastrophe. In such instances, the user profiles can include different paid-for business-levels for expediting communication services. For these services, the specialized processor nodes dynamically identify the regions of such public situations, by tracking samples of mobile terminals converging in such regions or via an external news feed, and access the business-level user profiles when the back channel data indicates that such users are in the region at such times. The application and/or user profile may call for opening a voice channel or for permitting a real-time live data stream to be transported through the network. In a high-priority emergency application, a video stream may be required on the downlink for consumption by a number of users simultaneously, and the network may need to react by employing multicasting or other relatively rare channel routing at least for a time until the congestion in the region's radio equipment (the base stations) clears.

In some embodiments and as a function of such location-based situations, traffic management ensuing from the processor node operations may lead to and directly involve operations by other portions of the network. As examples, the downstream traffic may be converted for transport over radio broadcast/multicast technologies such as MediaFlo or DVB-H, information can be sent to designated devices using other than the requested forms, e.g., using a WAP push, SMS, MMS or the like. Some of these redirections can be particularly useful for sending emergency information and less time-critical data such as targeted advertising.

Other aspects of the disclosure allow for the use of a peer-to-peer (P2P) network and a sharing scheme. In such an implementation, back channel data can be shared between user devices directly (e.g., direct point-to-point connection via Bluetooth), through a local area network (LAN) or otherwise. This can be accomplished, for instance, by replacing user identity information with a token, which can range from an entirely un-informing piece of data, to a mid-level demographic (male or female) or a much more detailed demographic (gender, age, zip code, favorite hobby and music, political party, etc.). Third parties can use such networks to gather and exchange such "tokenized" back channel data provided from the wireless network and optionally request that the wireless network provide geo-tagged notifications when similarly tokenized users approach the regions covered by these third-party networks. For instance, two retailers in the same mall might be separately tracking purchases of certain goods and services around a holiday and discover from "tokenized" back channel data, exchanged and otherwise, important demographics to assist in further sales for the next holiday.

Figure 1B:
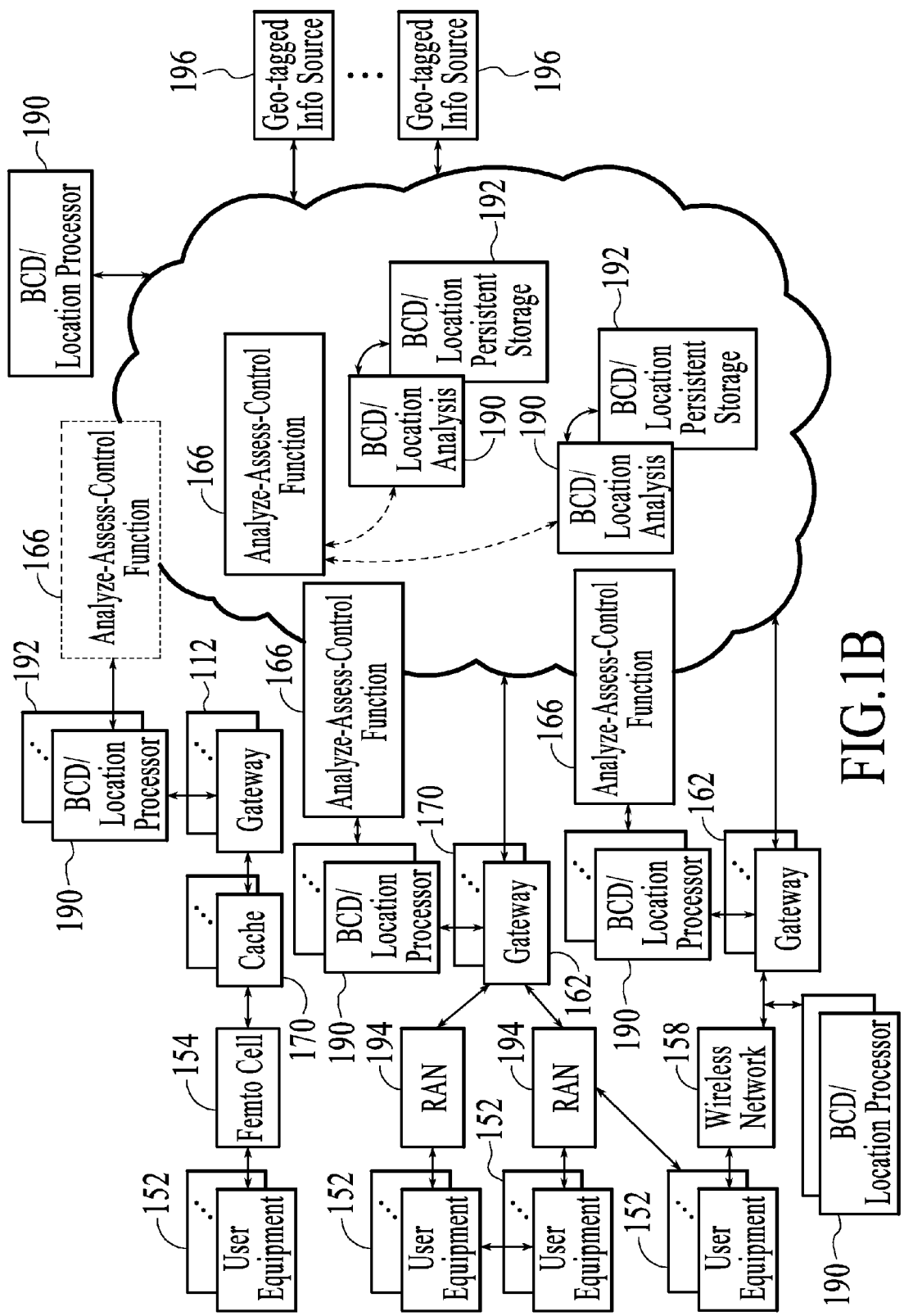
FIG. 1B depicts a block diagram of a system and various specialized processor-node configurations, consistent with embodiments of the present disclosure.

FIG. 1B depicts a block diagram of a system and various possible specialized processor node configurations, consistent with an embodiment of the present disclosure. User devices, or user equipment, 152 connect to content providers, to each other, or to other data sources through a variety of data paths. Non-limiting examples of user devices include cellular phones, smart phones, personal digital assistants (PDA), handheld gaming devices, laptops, home computers, vehicle computers and other devices that connect through wireless networks. For simplicity many components within the data path have been excluded from the diagram.

One example data path involves radio access networks (RANs) 194. The user device(s) 152 could be, for example, a smart phone connecting through a cellular communication scheme, such as Global System for Mobile communications (GSM), Universal Mobile Telecommunications System (UMTS), Code Division Multiple Access (CDMA) and communications protocols as defined by the $3^{rd}$ Generation Partnership Project (3GPP) or the $3^{rd}$ Generation Partnership Project 2 (3GPP2), 4G Long Term Evolution (LTE) and IEEE 802.16 standards bodies. These examples, however, are not limiting and aspects of the disclosure lend themselves to any number of connection protocols and mechanisms.

Gateways 162 can be used to connect between the RAN interface and devices using another protocol, such as Internet-based protocols. For example, the gateway could translate data between the Wireless Application Protocol (WAP) protocol and the worldwide web protocols e.g., from various Internet protocols to Wireless Markup Language (WML). The data gateways can be configured to use GPRS Tunneling Protocol (GTP) to communicate with the radio access network. Other embodiments may use other communications protocols. Other conventional operations of the data gateways are known. For example, the data gateways enable users of mobile stations to roam between cells, for example, to move between different locations within the radio access network, by tracking the mobile station's identity across the network. The data gateway may also provide authentication and data formatting functions.

As shown in FIG. 1B, multiple RAN connection points (or cells) can use a common gateway. Also shown in the figure are various memory circuits 192 for storing and retrieving banks of data used by the processor nodes 190. In one embodiment, the memory circuits 192 include one or more cache storage devices 170 located at certain of the gateways 162. This allows for sharing of cache storage between multiple RANs as a function of and directed by algorithms executed by the processor nodes 190. At the same time, there can be many gateways that are geographically (and logically) distributed around the cellular network and therefore the cache locations can be implemented with a relatively broad distribution.

Another example data path involves the use of femtocells 154. Femtocells are often implemented as a low power cellular base station that is connected to a cellular provider's network, often through a broadband connection (e.g., DSL or T1) link. Femtocells can be particularly useful for providing local cellular coverage to areas that otherwise have inadequate coverage, e.g., indoors.

For simplicity, many details of the data path are omitted as they can be implemented in a variety of manners. Often a gateway 162 provides an interface between user devices and another protocol, such as the Internet. This gateway 162 is a possible location for such a specialized processor node 190. The gateway 162 can be located within a cellular provider's network and thereby shared (or similar to the gateway) with RAN-based data paths from larger/traditional cellular base stations. As another possibility, the cache storage device can be situated between the gateway and the user device. For example, a processor node and storage device can be located at the femtocell base station location. This can be particularly useful for controlling data bandwidth between the femtocell and the remainder of the network as this can be limited by the capacity of the broadband data link (sometimes shared with a variety of other devices).

A third data path uses wireless network interface 158 to connect and request data. This interface can be, for example, Worldwide Interoperability for Microwave Access (WiMax), 802.11x or the like. Thus, user devices can connect using wireless hotspots or other local networks. As before, the data path may include a gateway 162 and other device 170 and/or 190. The gateway can sometimes be located at a cellular provider's location, but need not be so located. In another implementation, cache storage device 170 is located between the gateway and the user device. In this manner, such devices are located as part of and within control of the wireless network.

A user device (or mobile terminal) can sometimes be simultaneously capable of connecting to multiple data paths. For instance, a user device 152 may be in range of a wireless hotspot while also having a connection to a 3G-type data interface. The decision on how to retrieve the necessary data can be made based upon a number of criteria, one of which can be whether or not a specialized processor node has assessed from location-based back channel data that there is available data likely residing in a memory (or cache) of a particular data path.

Other embodiments of the present disclosure relate to access-analyzing-control functions 166. These functions can be used to accurately and effectively control what and where content is to be routed and/or cached based on back-channel location information provided by the processor nodes 190.

A number of examples are useful in illustrating such methodology. As one example, network communications are routed and/or cached reactively and/or predictively, based on such back-channel location information. In a relatively simple implementation, a cache located in a region is deemed "highly-populated by mobile users interested in airline arrival times, football scores, bus schedules" by assessing the presence of an excessive volume of types (ages of users) having user devices: currently registering on in the region so as to reactively process; and having locations converging on the region so as to predictively process. In either situation, the network nodes cooperate to store data in a FIFO fashion for serving this high population of mobile users before their requests would otherwise be overtaking the network's available bandwidth (e.g., as limited by the RAN equipment) by providing the same largely-redundant information across the network to the same region. If particular content is accessed multiple times before leaving the FIFO cache, it is provided from the cache and then moved back to the front of the cache.

As another example of a reactive implementation, a network data analyzer identifies content that is being accessed in high-volume and that is consuming considerable bandwidth. The data can then be cached according to the network impact of storing in a particular cache storage device. The system can thereby prioritize what data is stored according to network impact. This can be particularly useful for maintaining high priority content in the cache.

Yet another reactive implementation involves receiving region-specific indications of media content's popularity from $3^{rd}$ parties, such as the content providers. This can be implemented using an indication of the number of requested downloads within a predefined time period or using more complex parameters and algorithms.

In a predictive example, the analyzer uses data to predict future network demands for content. This can include predicting downloads related to breaking news stories or detecting access patterns that indicate that particular content is likely to increase in usage. For instance, as many video clips are accessed via a network, more users see the data and the demand increases rapidly as the users forward or otherwise send the video clip to other users. Another example relates to sporting events in which a large group of people attempt to access content at approximately the same time, such as near the end of a game. Large news events, such as natural disasters, can also result in a spike in content requests for related information.

Another aspect relates to determining how content is distributed between various storage elements. In conjunction with the assessment of a region deemed "highly populated," the processor nodes can make determinations on where to store data based upon numerous parameters. For instance, for a particular data path, the network analyzer can identify the most likely bottleneck for the data and chose to store the content accordingly. As another example, the analyzer might determine that certain content is related to another geographical region and thereby send the content to correspondingly located cache storage devices. Another example involves content that is associated with a particular type of device, e.g., smart phone application for a particular type of phone. This can also provide valuable information about where the content is best stored.

Accordingly, these important decisions can be based upon any number of other parameters or factors. A few examples may include user data, device characteristics, network characteristics, environmental factors and socio-cultural factors. Examples of user data include the data service price plan a user is subscribed to (e.g., premium vs. standard). Examples of device characteristics include screen size and supported audio and video codecs. Examples of network characteristics include network technology (e.g., HSPA, LTE), network topology (e.g., microwave vs. metro Ethernet backhaul) and available network capacity. Examples of environmental factors include time of day, location of sender and recipient and weather conditions. Examples of socio-cultural factors include holidays, sporting event schedules, etc. One or more of the context parameters may be combined to form a context which in turn is used to determine the management of the content in the cache storage elements. For instance, a video clip of breaking news may be automatically moved to cache storage elements nearer the edge of networks from the cloud cache or core network cache storage elements as the day breaks around the globe anticipating user requests for playback of the video clip.

Other aspects of the present disclosure allow for the use of multicasting in connection with a delay mechanism discussed herein. When a user device requests content that is highly-demanded and/or that consumes large amounts of bandwidth, access to the content can be delayed. Access by other user devices requesting the data is also delayed. As part of the delay mechanism, the user devices are presented with information for connection to a multicast session. The user devices then connect to the same multicast session and receive the content therefrom. The multicast session can be initiated for the group by presenting a synchronization time for the session to each of the user devices or can simply be periodically repeated (e.g., in the case of very-highly demanded content) thereby allowing devices to connect as necessary. Synchronization/multicast information can be sent as part of the delay mechanism through a variety of suitable mechanisms.

Yet another implementation is directed to using multicasting for pushing data to large number of devices. Multicast information (e.g., session initiation information) can be sent to groups of devices, e.g., using a WAP push, SMS, MMS or the like, and the devices can respond by connecting to the multicast stream/radio channel. This can be particularly useful for sending emergency information, targeted advertising or even software updates to a large group of user devices. The content can be cached and sent to groups of devices until all desired devices receive the content. This can allow for updates to be sent and received over time and to devices that may subsequently connect to the network.

Multicasting can be particularly useful for efficient use of radio signal bandwidth. For instance in a UMTS context, a group of mobile stations can be configured to listen to the packet notification channel (PNCH) on which a point to multipoint-multicast (PTM-M) notification is sent. Data can then be sent to the group of mobile stations using a shared packet data traffic channel (PDTCH). These operations can be important for many contexts including, for example, emergency situations where specifically-equipped or configured groups of mobile stations need to monitor the situations on a priority basis. This type of multipoint-multicast mode can be initiated in response to certain of the processor nodes executing processes to track externally-reported events (from other databases and networks) and/or converging populations of user devices to predict and/or react to location-based back channel data.

Consistent with another embodiment, a user application can be installed/downloaded to a mobile station in response to a user or third-party profile accessed by the processor node. The processor node uses the profile information as a reference for identifying that the mobile station should be tracked as it approaches a favorite region, such as "home." In response, the user application can facilitate the intelligent control and delivery of content to the device by cooperation with and in response to the device location being monitored by the processor node. For instance, the application provides configuration options for accessing/downloading content. In one embodiment, the application controls delivery options based upon content type and/or content source as determined by the user. Such delivery options might include expedited delivery for rich media (recently published e-books of videos). This allows the user to specify which, if any, content is provided using aspects of the present disclosure (e.g., available caching locations or access limitations). Other aspects of the application allow a user to modify delivery settings dynamically. The user can use the application to route content delivery to e-mail, to delay delivery, to use bandwidth throttled, or to access a preferred/premium service which allows access to cache locations and similar functionality. This can be particularly useful for changing deliver options as may be desirable when a user is travelling and has limited access to other network resources (e.g., home computer access or email).

To implement such modifications, the application can modify content requests to denote user preferences (e.g., by modifying routing data for access request or adding preference indications thereby instructing how a remote device should control content delivery). Alternatively, user profile data can be stored by a service provider. The application then updates the user profile data according to user preferences. Access to user profile data can also be provided via other interfaces, such as via a website.

As a particular example, the user may indicate that a first website contains content that is to be afforded a relatively low priority and for which delivery can be delayed or otherwise slowed. The user may indicate that another website is to be afforded high priority, and delivery should be prioritized. The cache/data control device(s) process access requests for each website accordingly. For billing purposes, the user may be charged a premium fee for the high priority accesses. As another example, when a mobile device requests access to content, the mobile device presents the user with content delivery options. These options can be a priority indication and/or more detailed options, such as accepting delayed delivery for a reduced price and/or paying extra for access to a cached version. Other options include transcoding options, such as indicating the acceptability of different video resolutions or coding schemes.

These and other applications can be implemented on mobile stations consistent with the present disclosure. The application includes programmed instructions that, when executed by a computer/processor, perform one or more of the methods and/or steps of the disclosure. The instructions can be programmed on a computer readable medium including non-volatile or volatile memory circuitry.

Figure 2A:
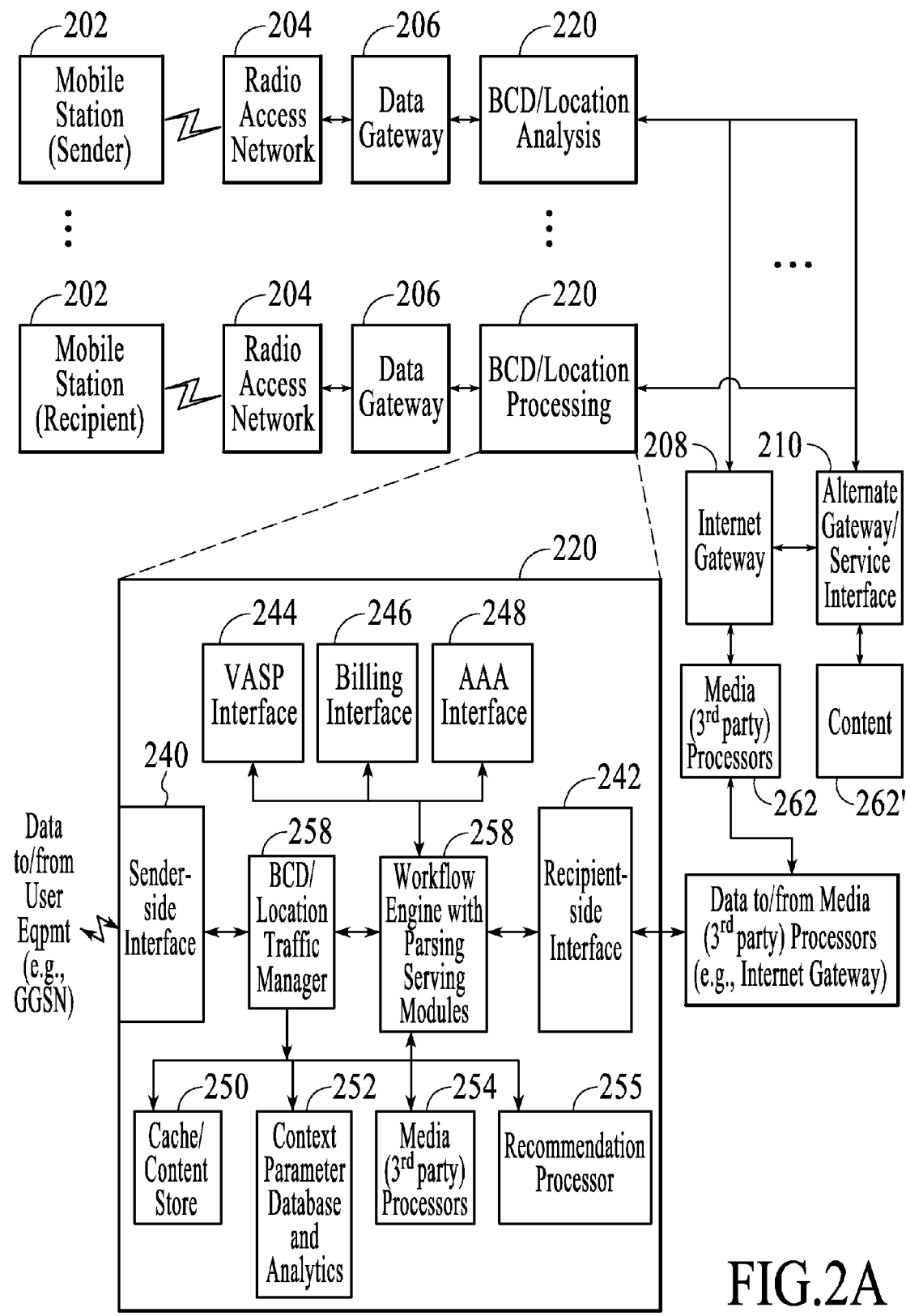
FIG. 2A shows a block diagram for data flow relative to certain network accesses by mobile devices, and including an expanded block diagram of a specialized processing node, consistent with embodiments of the present disclosure.

Various aspects of the present disclosure relate to particular types of data flow in response to the location-based operations performed by processor nodes 190. FIG. 2A illustrates a block diagram useful for discussing examples of such data flow relative to content access by mobile devices, consistent with embodiments of the present disclosure. The system depicted in FIG. 2A includes mobile stations 202, radio access networks 204, data gateways 206, an Internet gateway 208, and data intermediation modules 220 which are used to illustrate an example structure for providing specialized back channel operations by the processor nodes. Although the system is depicted and described with certain components and functionality, other embodiments of the system may include fewer or more components to implement less or more functionality.

For description purposes, one of the mobile stations 202 requests multimedia, or other, content and one of the data intermediation modules 220 receives the requests. The mobile stations 202 can include handheld wireless devices, such as cell phones, mobile phones, smartphones, personal digital assistants (PDA), handheld gaming devices etc, that can wirelessly communicate using radio frequency (RF) communications signals.

In certain embodiments, the radio access networks 204 facilitate radio communications between the mobile stations 202 and a core network that includes the data gateways 206, the Internet gateways 208, and the data intermediation modules 220. In an embodiment, the radio access networks include one or more base stations to facilitate communications among the mobile stations that are within a communication range of the base stations. Each base station has at least one RF transceiver and the base stations communicate with the mobile stations using RF communication signals. The radio access network facilitates network communications among multiple mobile stations within the same radio access network and between mobile stations in other radio access networks and provides interfaces to facilitate communications with other entities, such as a Public Switched Telephone Network (PSTN), a Wide Area Network (WAN), the Internet, Internet servers, hosts, etc., which are outside of the radio access network. In an embodiment, the network elements depicted in FIGS. 1A and 1B are part of a wireless network that is operated by a single wireless service provider.

Data signals communicated between the mobile stations 202 and the radio access networks 204 include, but are not limited to, analog and/or digital RF signals (i.e., radio waves) for any type of communication mode, including text messaging, multimedia messaging, voice calling, and Internet browsing. The radio access network can support various different RF communications protocols, including without limitation, GSM, UMTS, CDMA, WiMax and communications protocols as defined by 3GPP, 3GPP2, or IEEE 802.16. Although some wireless communications protocols are identified herein, it should be understood that present disclosure is not limited to the cited wireless communications protocols.

The data gateways 206 configure outgoing data access requests for use with one or more networks and configure incoming data for use by or display on a mobile station 202. As shown, each data gateway interfaces directly with a radio access network 204 and a data intermediation module 220, although other embodiments may include other intermediate functional elements.

The Internet gateway 208 provides a gateway for receiving data from content providers 262 (or optionally between mobile stations 202). The content providers 262 can be Internet-connected hosts and/or servers. For example, the Internet gateway can be a Wireless Application Protocol (WAP) gateway that converts the WAP protocol used by the radio access network to the Hypertext Transfer Protocol (HTTP) protocol used by the Internet. In an embodiment, the Internet gateway enables mobile stations to access multimedia content, such as Hyper Text Markup Language (HTML), compact HTML (cHTML), and extensible HTML (xHTML), which is stored on Internet-connected hosts and/or servers.

The disclosure is not limited to Internet communications and can be used in connection with various other networks and content sources as shown by alternative gateway/service 210. For instance, alternative gateway/service 210 can be a custom interface provided by a wireless service provider. The wireless service provider can use the custom interface to provide content to mobile devices. As an example, the content could be movies, applications, music, games or other downloadable data. The wireless service provider can store the content at one or more centralized locations and then distribute the content to cache locations as desired and discussed herein. Mobile device users can be charged for access to the content and at the same time realize an improved quality of experience due to intelligent caching and/or delivery of the content.

In a particular implementation of the disclosure, the wireless service provider can provide data content originating from other content providers. The other content providers purchase access to the caching/data control aspects of the present disclosure, thereby providing improved quality of experience for mobile users attempting to access their content.

The FCC may impose ("net neutrality") rules that would prohibit Internet service providers from slowing or blocking of information and certain applications over their networks. In this context, it should be noted that even for content that is allowed equal access to network bandwidth; however, subscribers to the intelligent data control of the instance disclosure can provide a higher quality of experience for their respective content.

With reference to FIG. 2A, in a data acquisition process, a mobile station 202 generates a data request message (e.g., HTTP, SIP, RTP) that identifies a content provider and desired content (e.g., by entering a URL or other identifier). The data intermediation modules 220 can be located between gateways 206 on one side and the Internet gateway on the other side. In particular, each data intermediation module is functionally located in a data path that is between the respective data gateway on one side and the Internet gateway on the other side. In accordance with an embodiment of the disclosure, the data/caching module 220 manages the flow of content between content providers and mobile stations. The modules can include, or have access to, a cache storage device for storing content.

In an embodiment, the data intermediation module 220 intercepts content requests that are sent from a mobile station and processes the requests to determine how to handle the content requests. This can include determining whether the requested data is present in the cache and/or performing various other functions that help to improve the performance of the system. For example, the data intermediation module may perform any of the following functions:

1) limit access to content by a requesting mobile station;
2) cache content for delayed delivery;
3) optimize the content by transcoding thereof;
4) provide content directly from the cache without retrieving the content through the Internet gateway; and
5) forward content between data intermediation modules to preemptively populate caches with content.

In alternative embodiments, other techniques for media streaming such as HTTP-Progressive Download (PD) and HTTP adaptive bit rate streaming may be utilized. In a particular embodiment, the content is part of streaming data that is accessible within the 3GPP end-to-end PS streaming service specification. Within this specification the content is transported using Real time Transport Protocol (RTP) over User Data Protocol (UDP). Session control/setup is implemented using Real Time Streaming Protocol (RTSP). For cached data, the streaming session can be effectively intercepted by streaming from the cached location instead of the indicated URL. The cache device can identify requests for streaming sessions for cached URL locations and thereby intercept the connection. This can be accomplished in a number of manners. For instance, connection information is sent to a requesting device using a session description protocol (SDP) file. In one instance, the SDP file can be adjusted based upon the existence of cache data. The adjustment can include changes due to transcoding and or connection information due to cache location.

In alternative embodiments, other techniques for media streaming such HTTP-Progressive Download (PD) and HTTP adaptive bit rate streaming may be utilized. In another embodiment, the content can include content (media or otherwise) that is accessible via OMA generic content download over-the-air specification. This access can include either download with separate delivery of download descriptor and media object or download with co-delivery of descriptor and media object. The download descriptor contains information about a media object and instructions on how to download the content. The data flow control can thereby be effected by modifications to the download descriptor.

As a specific example a data network can involve multiple/disparate entities managing nodes/gateways or other content delivery elements. A content control device can initiate content delivery (streaming or otherwise) via a setup request. In a more particular embodiment, the content control device modifies the setup request as a function of the current cache state or other network parameters (such as subscriber relationship, content provider agreement or analytics applicable to network environment). In some instances, the modified request includes options for content delivery that can be acted upon by a downstream node or entity.

The data intermediation modules 220 can be particularly useful for improving the performance of live data content delivery by intelligent caching and data flow control. Caching and flow control decisions can be made based upon the status of cache storage devices at various locations. For instance, the data intermediation modules 220 can determine whether or not all or part of a particular requested content is already stored in a cache storage device near the recipient device. In this manner, the cached content can be retrieved from the data cache device and thereby not sent over the core network.

To facilitate this cache-based communication between data intermediation modules 220, a variety of messaging protocols can be used. For instance, the existence of multiple cache locations allows for content retrieval to occur between caches thereby alleviating the need to access the content provider directly. While not limiting, in one example a central cache managing server maintains a list of cached content for the various cache storage devices. A data intermediation module 220 checks with this managing server to determine whether the entire content needs to be transmitted as a function of the status of cache storage devices. In another example implementation, the data intermediation modules 220 communicate directly with one another.

These and other various communications can be implemented over the control protocols for telephonic devices. For instance, the cache checks can be sent within the signaling system 7 (SS7) protocol, thereby facilitating transmission across a number of different network platforms including, for instance, the PSTN. Other communication protocols are also possible. An example embodiment using such communication flow is discussed more detail in regards to FIG. 3.

Additional improvements in performance can be achieved by processing the content to, for example, optimize the content and to provide value added services.

Each one of the data intermediation modules 220 (and/or associated processor nodes and storage devices) can be a standalone network element, such a distinct network node (e.g., a different "box") that is connected to the network by wired and/or fiber-optic network connections using network communications protocols such as Internet Protocol and Ethernet. Alternatively, each one of the data intermediation modules 220 may be integrated with one of the other network elements. For example, a data intermediation module may be located in the same "box" as one of the data gateways 206, the Internet gateway 208, or other components. Whether the data intermediation module 220 is physically located in a distinct physical network node or in the same network node as another network element, the functionality of the data intermediation module can be similar.

Use of a data intermediation module as described herein is applicable to different kinds of radio access networks, including, for example, 3GPP, 3GPP2, IEEE 802.16, and 4G radio access networks. For instance, radio access networks as defined by the 3GPP include a NodeB, a Radio Network Controller (RNC), a Serving General Packet Radio Service (GPRS) Support Node (SGSN), and a Gateway GPRS Support Node (GGSN). These nodes are discussed briefly as an example system, but the disclosure is not limited thereto.

A NodeB is a network element that performs base station functionality. A NodeB can use various communication protocols, such as Wideband Code Division Multiple Access (WCDMA)/Time Division Synchronous Code Division Multiple Access (TD-SCDMA), to communicate with the mobile stations. In an embodiment, each NodeB includes an RF transceiver that communicates with the mobile stations that are within a service area of the NodeB. In one embodiment, the NodeBs have a minimum amount of functionality and are controlled by an RNC. In another embodiment in which High Speed Downlink Packet Access (HSDPA) is used, some logic (e.g., retransmission) is handled by the NodeB to achieve shorter response times.

Each RNC is a network element that controls the connected NodeBs. In particular, the RNC is responsible for radio resource management and mobility management. The RNC is also the element that performs encryption before user data is sent to and from a mobile station. In an embodiment, radio resource management operations include outer loop power control, load control, admission control, packet scheduling, handover control, security functions, and mobility management. The Radio Network Controller may also various radio resource optimization operations.

Each SGSN is a network element that delivers packets to and from the mobile stations within a corresponding geographical service area. Functionality of the SGSN includes packet routing and transfer, mobility management (e.g., attach/detach and location management), logical link management, and authentication and billing. In an embodiment, the SGSN maintains a location register that stores location information, such as the current cell of a mobile station, and user profiles, such as International Mobile Subscriber Identity (IMSI) address used in the packet data network, of all GPRS mobile stations that are registered within the corresponding geographical service area of the SGSN.

Each GGSN is a network element that provides interworking between the GPRS network and external packet switched networks, such as the Internet and X.25 networks. In particular, the GGSN hides the GPRS infrastructure from the external networks. Functionality of the GGSN includes checking to see if specific mobile stations are active in the radio access network and forwarding data packets to the SGSN that is currently supporting a mobile station. The GGSN also converts GPRS packets coming from an SGSN into the needed packet data protocol format (e.g., Internet Protocol or X.25) and forwards packets to the appropriate external network. The GGSN is also responsible for IP address management/assignment and is the default router for the mobile stations. The GGSN may also implement Authentication, Authorization, and Accounting (AAA) and billing functions.

FIG. 2A also depicts a detailed example of a data intermediation module 220 in accordance with an embodiment of the disclosure. The data intermediation module 220 includes a sender-side interface 240, a recipient-side interface 242, a Value Added Service Provider (VASP) interface 244, a billing interface 246, an AAA interface 248, a cache storage module 250, a context parameter and analytics database 252, a media processor 254 for handling $3^{rd}$ party requests and reports, recommendation processor 255, a traffic manager 256, and a workflow engine 258. Without loss of generality, some of the content flow is discussed herein in terms of content received over the Internet; however, the data content could be provided via other suitable mechanisms and from other sources.

The sender-side interface 240 is an element of the data intermediation module 220 that provides an interface to the sender-side functional elements of the system and is the incoming interface for data content sent to the recipient-side mobile station. The recipient-side interface 242 is an element of the data intermediation module 220 that provides an interface to the recipient-side functional elements of the system and is the outgoing interface for data content destined for a recipient-side mobile station. In the embodiment of FIG. 2A, the recipient-side interface is functionally adjacent to the (Internet) gateway or other network components (e.g., a MSF server), and the receiving data intermediation module.

The VASP interface 244 is an interface for value added service providers (e.g., service providers that are distinct from the content provider or the operator of the system and wireless communications network). In an embodiment the value added service providers are third-party service providers that provide some additional service, functionality, or data to the system. In an embodiment, the VASP interface enables value added service providers to provide direct inputs to the data intermediation module related to, for example, sender parameters, recipient parameters, and optimization parameters.

The billing interface 246 of the data intermediation module provides an interface to a billing system or billing systems. In an embodiment, the billing interface enables the system to implement a billing program for data services. The billing system can also be used to bill content providers for access to the caching or for preferred content delivery features (e.g., enabling of RAN-based multicasting or reduced throttling). Content providers could request that certain content be stored and easily accessible, thereby improving the user experience for the cached content. The billing program could record such requests and charge content providers as a function of the number of cache requests, the number of accesses to the content, the bandwidth used by accesses to the content and the like.

Another implementation involving a billing function is directed to a centralized controller (or a hierarchy of important data and/or multiple storage/cache locations at various points within the network) for distributing content to multiple locations based on mobile-terminal population changes in the regions of the locations. Content providers can request distribution of content for improved access based upon defined parameters. These parameters can include, for instance, geographical location, type of wireless service available (e.g., 3G, WiMax), wireless service provider (e.g., AT&T, Verizon) or state/country boundaries. The billing can be accomplished using a centralized model, such as based upon the number of cache locations the content is to be loaded to, and/or a decentralized model where each location tracks usage and generates billing data therefrom. In yet another embodiment, a semi-centralized model involves two or more business entities coordinating and negotiating billing models and content delivery control/caching, bandwidth and quality factors. These and other aspects can thereby be used with various other parameters and content control functions.

Another implementation relating to billing methods involves a method of controlling delivery of source data content through a communication network including a wireless-technology network and another network. The wireless-technology network is controlled by a first business entity (e.g., data caching/flow control provider) and the other network being controlled by a second business entity (e.g., Internet Service Provider/content provider). In response to notification that source data content is to be routed through the communication network, control data is accessed, representing data-delivery conditions agreed to between the first and second business entities. In response to and as a function of the control data, substantially redundant representations of the source data are directed to cache memories located at nodes in the wireless-technology network. The system delivers redundant representations of the source data from the cache memories to comply with the notification while effecting an improved quality of experience or improved system bandwidth allocation in the communication network. In a specific example of such a data network involving multiple/disparate entities managing nodes/gateways or other content delivery elements, a (streaming or otherwise) setup request is modified by one of the business entities to effect delivery as a function of the current cache state or other network parameters (such as subscriber relationship, content provider agreement or analytics applicable to network environment).

The AAA interface 248 of the data intermediation module provides an interface to authentication, access control, and accounting information and services.

The cache storage module 250 of the data intermediation module 220 provides storage for content (e.g., video, audio, website, messages). In an embodiment, the cache storage module enables the data intermediation module 220 to delay communication of content to other network elements when desired. Additionally, the processor nodes and associated storage modules can communicate with one another to allow for the data intermediation modules to implement an accelerated delivery mechanism by sending content directly between data intermediation modules without passing through an Internet gateway.

The context parameter database 252 of the data intermediation module provides a repository for context parameters that can be used to control content caching and/or delivery. In an embodiment, context parameters may include user data, device characteristics, network characteristics, environmental factors, and socio-cultural factors. Examples of user data include the messaging price plan a user is subscribed to (e.g., premium vs. standard), the age of the user, or the billing location of the user. Examples of device characteristics include the screen size and supported audio and video codecs of a mobile station. Examples of network characteristics include network technology (e.g., High Speed Packet Access (HSPA), LTE), network topology (e.g., microwave vs. metro Ethernet backhaul), and available network capacity. Examples of environmental factors include time of day, location of sender and recipient, and weather conditions. Examples of socio-cultural factors include holidays, sporting event schedules, etc. One or more of the context parameters may be combined to form context information that is used to determine how the data intermediation module processes content. For instance, content provided to a user having a standard rate price plan may not get priority treatment relative when the system is congested due to a wild fire raging in the area.

The media processor 254 of the data intermediation module supports the processing of content to modify one or more aspects of the multimedia (and other) content. In one embodiment, the media processor transcodes the content. For instance, video content may be modified by changing the spatial and temporal resolution, changing the encoding bit rate, and/or changing the codec and/or codec parameters. In another embodiment, audio content may be changed by changing the sampling rate, changing the number of channels, changing the encoding bit rate, and/or changing the codec and/or the codec parameters. In another embodiment, image content may be changed by changing the spatial resolution, changing the bit depth, changing the encoding bit rate, and/or changing the codec and/or the codec parameters.

In another embodiment, the media processor 254 processes the content to enhance it. For example, the media processor may insert an advertisement in audio, video, image, or textual format into the content. In another embodiment, the media processor may convert textual symbols, such as emoticons, to an equivalent image representation.

Figure 2B:
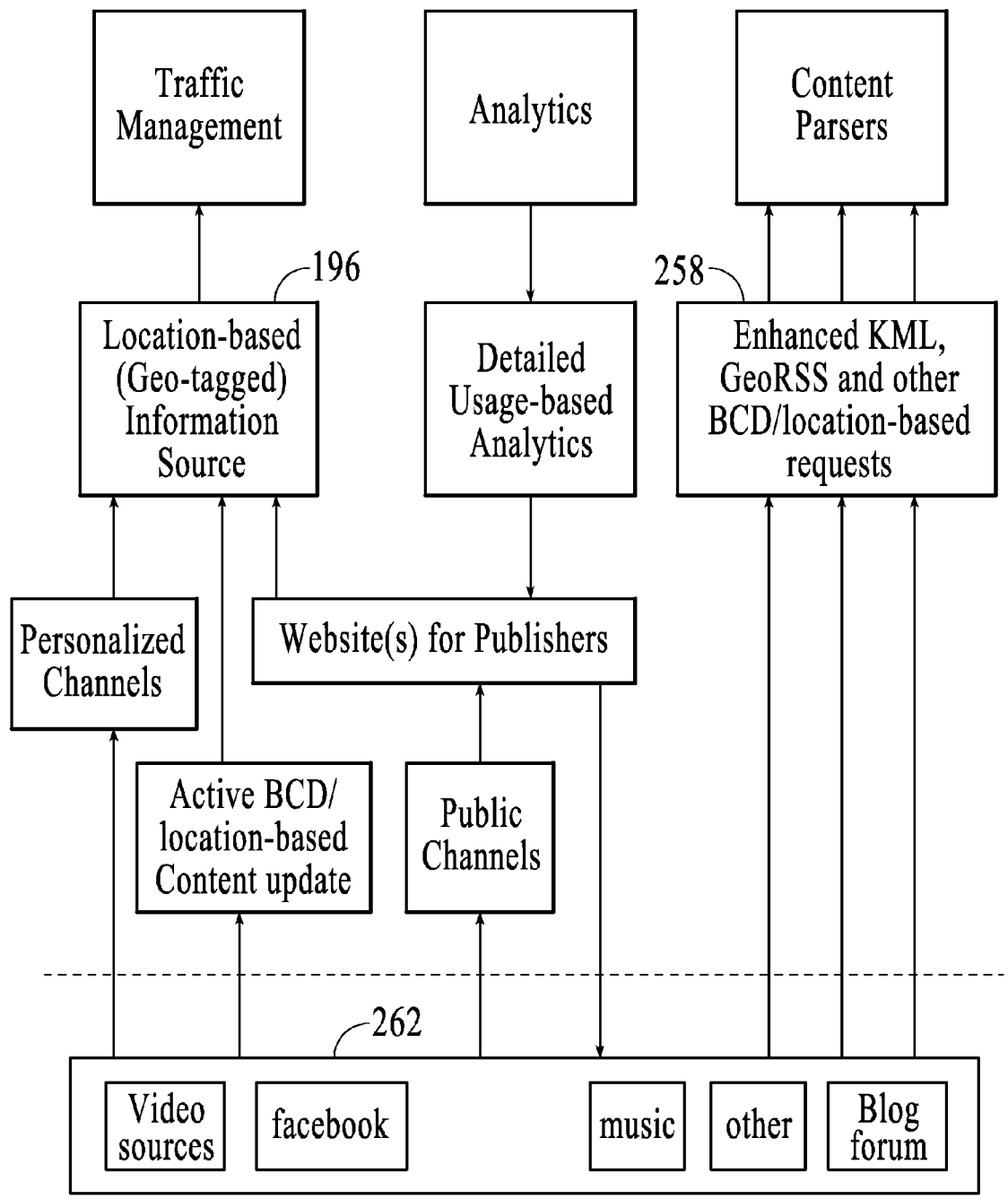
FIG. 2B shows a block diagram for a publisher API relative to certain network accesses by mobile devices, and for use with one or more of the internal or external nodes shown in the block diagrams of one or more of the above figures, also consistent with embodiments of the present disclosure.

The recommendation processor 255 of the data intermediation module is configured to proactively push real-time recommendations to mobile users. Using location-based and user-profile back channel data, the recommendation processor 255 can proactively push out location-based recommendations regarding a variety of user preferences and parameters. As indicated further in connection with FIG. 2B, these might include video sources for rich-media downloads, preferred music sources and blog forums, social network friends whose mobile terminals are relatively geographically nearby, and interesting local opportunities to users on the go. As users travel, they can thereby receive reports from the recommendation processor 255 and communicate therewith on a convenient and region-specific basis. In certain systems, these region-specific recommendations and alerts utilize region-specific data sharing and distribution via a region-specific cache, as previously discussed.

The traffic manager 256 of the data intermediation module is configured to provide traffic management in the network. In an embodiment, the traffic manager regulates the flow of content traffic between the functional elements of the system. For example, when a mobile station requests content from a content provider, the traffic manager regulates the data transfer rate by delaying or throttling back the transmission of the content. In an embodiment, the traffic manager delays the transfer of content by terminating the Transmission Control Protocol (TCP) connection when a mobile station initiates the transfer process. In an embodiment, the traffic manager throttles back the transfer of content by delaying the sending of TCP SYN packets from the data intermediation module to the mobile station while the content is being transferred. Other types of traffic management can be implemented by the traffic manager.

The workflow engine 258 of the data intermediation module is configured to process the content and, in response to the processing, to determine where/whether to cache the content based on the aforementioned discussion. In an embodiment, the workflow engine determines where/whether the content currently resides relative to one or more cache locations. This determination can be used to decide how best to retrieve the content, such as whether to access the content provider through the Internet gateway or from another data intermediation module.

In one implementation, the workflow engine can access resources from any of the traffic manager, the VASP interface, the billing interface, the AAA interface, the cache storage module, the context parameter database, and the media processor in order to help make routing/caching/control decisions and any of the criteria described above with respect to the traffic manager, the VASP interface, the billing interface, the AAA interface, cache storage module, the context parameter database, and the media processor can be considered by the workflow engine. Additionally, the workflow engine may dictate how content is processed within the data intermediation node. For example, the workflow engine may specify a particular type of transcoding for the content based on the capabilities of the intended recipient-mobile station.

In a particular embodiment, a billing node may be located between the GGSN and the data intermediation module.

FIG. 3 depicts an example wireless network consistent with various cellular systems and an embodiment of the present disclosure. Data paths are indicated by solid connection lines and control paths are indicated by broken lines. As discussed herein, embodiments of the present disclosure allow for location-based cache control to be implemented using existing control paths. If desired, the control data can be sent consistent with the SS7 and related control protocols. This allows for additional flexibility including backward compatibility across disparate systems. Moreover, since the existence of stored data may eliminate and/or reduce the necessity for an end-to-end data path between source and destination devices, the use of the control protocols can be particularly useful in determining this necessity before setting up data path(s).

For instance, connection to content might be established using HTTP or session-initiation-protocol (SIP). An intervening control server/device can check the status of various storage devices relative to the desired content indicated by the connection request for a given population of mobile terminals in a particular location. If the desired content is indeed readily available and/or cached, the intervening control can intercept the connection request and establish a link with the storage device instead of the destination indicated by the requesting user/mobile device.

In various embodiments of the present disclosure, the storage devices operate to maintain synchronicity with content providers. In particular, content providers may change the content and thereby render the versions of the content out-of-date. The synchronicity can be maintained in a number of different manners. One mechanism involves periodically, or in response to user device requests, checking the version/status of the content at the content provider. If the content has changed, the version stored in the storage devices can be updated. Another mechanism is to allow for content providers to push new updates directly to the storage devices. This allows content providers to have more control over the content delivery, but may require more interaction with the content providers, e.g., establishment of preexisting protocols and other agreements.

Consistent with embodiments of the present disclosure, various processes (algorithms) can be implemented in connection with location-based back channel data features. According to one such process, a control processor(s) is configured to access a database of context parameters. The particular parameters and their respective weight in the analysis can be selected according to a number of criteria. According to one such criterion, a lookup table of desired context parameters is indexed according to the content type. The content type can include such characterizations as media type (e.g., video, audio or text), content source, real-time requirements (e.g., streaming/live data) and/or data size. The lookup table then provides a list of context parameters along with instructions on how to use the context parameters. The control processor uses these parameters to determine whether, to which types of mobile devices, and/or where to send messages, recommendations and/or content. The control processor, using the user profile of prospective recipients of such data, can also determine whether or not to limit access thereto based on user preferences and the location-based back channel data.

In a particular implementation, the control processor node assesses the propriety of proceeding with such user-directed communications by first rating the message or content and then comparing the content rating to previously stored content as indicated in a user profile. If the new/current content has a higher rating, then the control processor instructs the relevant nodes for delivery of the content and/or its storage for later access.

The above-mentioned processes (algorithms) show the diversity and wide ranging application of embodiments of the present disclosures and therefore are not meant to be limiting. Variations of the above-discussed embodiments, for example, are based on combinations of the disclosed aspects as set forth above and/or in the claims that follow. Variations of the embodiments may be employed for wireless communication networks based on 3G (e.g. CDMA, UMTS, HSPA, HSPA+) or 4G (e.g. WiMax, LTE, LTE-Advanced) standards.

Figure 4:
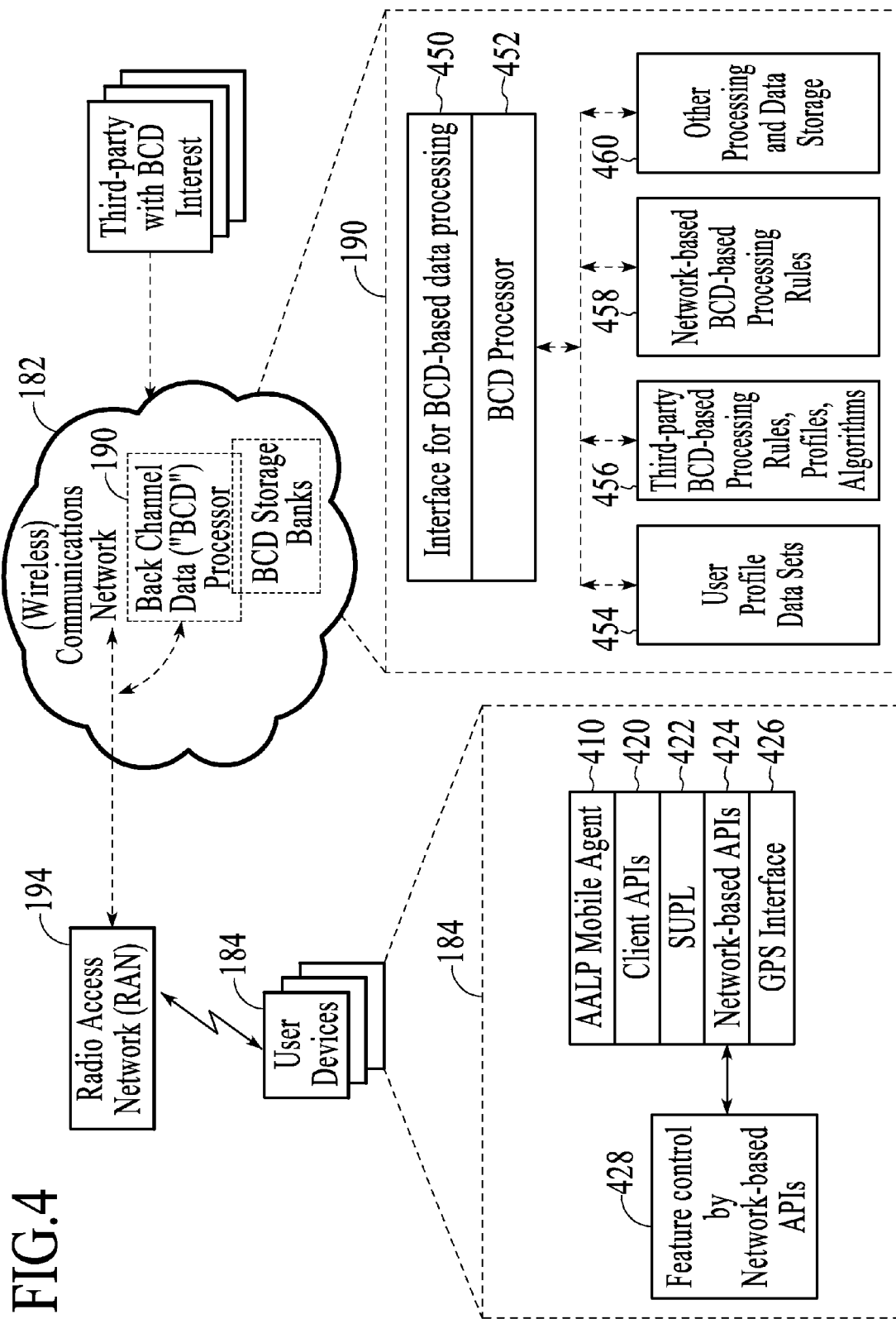
FIG. 4 depicts an example network, including a wireless network, consistent with various cellular systems and embodiments of the present disclosure and further including expanded example block diagrams to illustrate aspects of the user devices and processor-node circuitry useful for many of the embodiments discussed and illustrated herein.

FIG. 4 depicts an example network, including a wireless network, consistent with various cellular systems and embodiments of the present disclosure and further including expanded example block diagrams of relevant hardware-software circuits of both a user device and processor-node circuitry applicable to many of the embodiments discussed and illustrated herein. The mobile or user device 184 includes an Adaptive Autonomous Location Push (AALP) mobile agent 410 to interface with an AALP adapter provided in the mobile positioning center (MPC—internal to the wireless communications network 182 and RAN 194. The mobile or user device 184 also includes other hardware-software circuits such as client application program interfaces (APIs) 420, a Secure User Plane for Location (SUPL) interface 422, and a GPS interface 426. Such applications are further described in US Patent Application Publication No. 2007/0026871, assigned to the instant assignee.

The mobile device 184 further includes specialized-privileged application program interfaces 424 and 428 which are configured to permit the mobile device 184 to implement a variety of network-specific and network-cooperative location-based operations. For instance, the specialized-privileged application program interface 428 provides feature control for the mobile device, in response to a communication from the wireless-technology equipment that a user-alert indicator should be changed in the mobile terminal when the mobile terminal is in a geographic region. The user-alert indicator can change between modes of an audible alert and a vibrating alert, e.g., when the region designates a worship service, quiet hours such as during classroom time.

As another example, the specialized-privileged application program interface 424 can provide the wireless communication network 182 user-profile updates such as personal travel calendar information useful for assisting in preparing location-specific processors and (cache) memory devices within the wireless communication network 182 in advance of the anticipated travel.

The processor node 190 and its related memory device 192 is also expanded, thereby illustrating the intermediation interface for acquiring and processing the location-based back channel data. The intermediation interface has a front end processor 450 which acts as a gateway for accessing selected user profiles as a function of receipt of regional region-relevant alerts of user devices from the RAN equipment 194. The intermediation interface has a BCD (back channel data) processor 452 which performs the translations and matching between the back channel data received from the front end processor 450 and other stored data. For sets of programmed operations that specialize the processor nodes to provide certain features (benefitting the mobile users, the wireless network and/or third parties), the BCD processor 452 carries out immediate local access and (cache-like) processing of the relevant user profiles in processor module 454, third party profiles and related instructions in processor module 456 and network-specific BCD-related operating and access rules in processor module 458. Another processor module 460 is generally configured for other functionality such as that discussed above in connection with the lower portion of block 220 of FIG. 2A.

Figure 5:
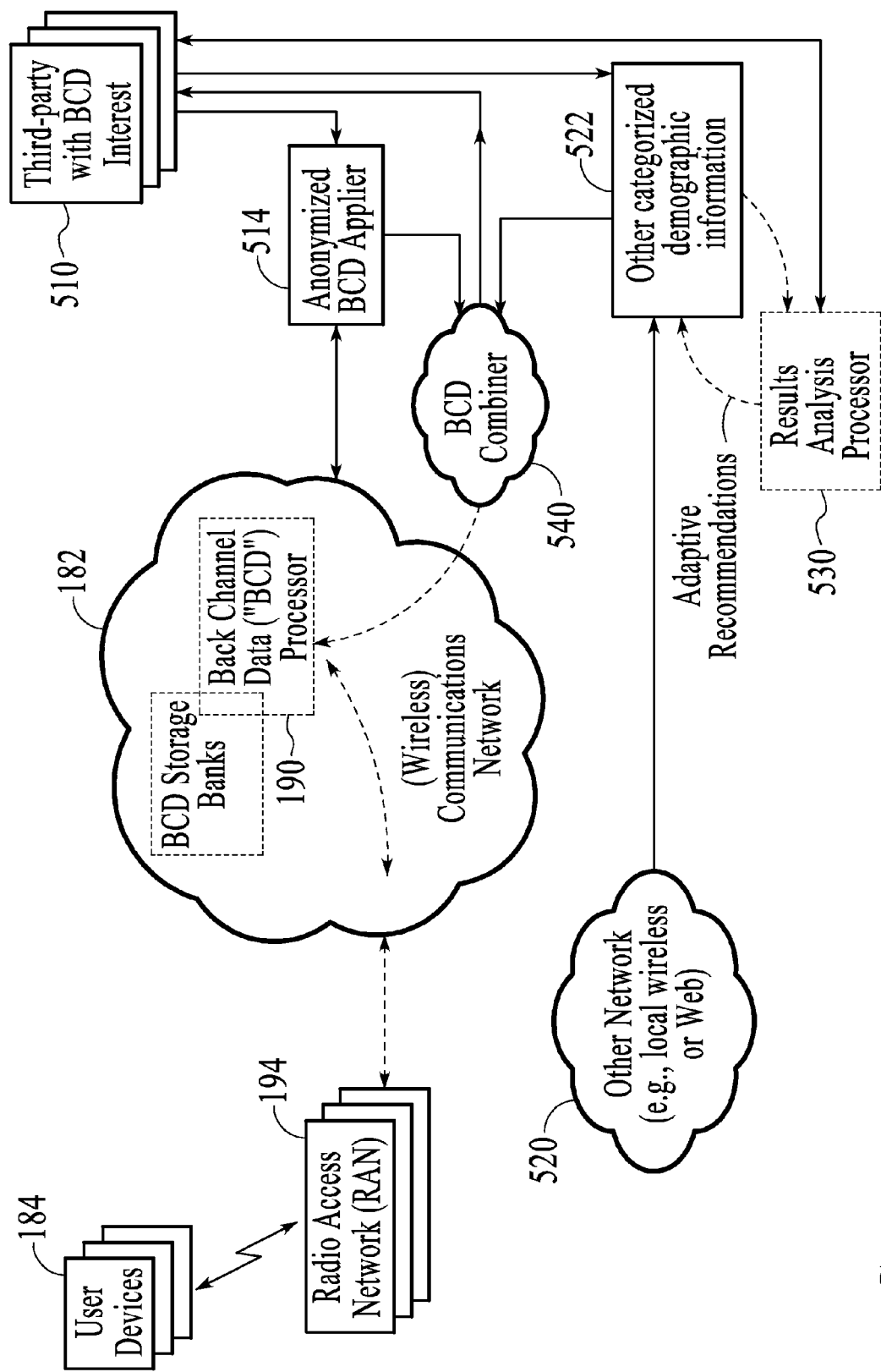
FIG. 5 depicts an example network, including a wireless network, consistent with various cellular systems and embodiments of the present disclosure including many discussed and illustrated herein.

FIG. 5 depicts an example network, including a wireless network, consistent with various cellular systems and embodiments of the present disclosure including many discussed herein involving third party requests and BCD-related accesses. An example application involves a communication network with a wireless network 182 that provides access to back channel data to nodes 510 managed by third parties. A processor node 190 in the wireless network uses and processes location-based mobile-terminal data as geographically-tagged information sources for review and possibly further processing and analysis by the third parties. Processor 514, acting as an agent of the network 182, anonymizes the sensitive BCD data before publishing these geographically-tagged information sources. In some configurations, the processor node 190 receives from third parties' requests and feedback via processor interface, and/or input from other resources such as a server over the Web 520 and privately-held databases 522 which might include adaptively re-processed versions of the data previously provided to the third parties. Database 522 and results analysis processor 530, feed and/or are controlled by a third party, are depicted as receiving instructions and rules from third parties for demographically refining work product received from the processor node 190 with at least one iteration for refining the work product such as by including additional parameters latently obtained regarding the set of demographic information. In some configurations, the processor 514 receives such refined work product from the third party node 510 and reverses the "tokenization" of the sensitive user data; in this manner the processor node 190 is able to re-process in the ensuing iterative steps with more complete information than would otherwise be accessible to the third party. A BCD combiner 540 is a processor node adapted to reconstruct useable data for the processor node 190 based on the (the reverse "tokenization" of the sensitive user data) output from the processor 514 and the refined rules and/or parameters received from the third party node 510.

This methodology can be extremely useful in a variety of situations including, for example, use of the processor node as an independent auditor for a transaction between two parties (bidding auction, business-business dispute settlement, etc.). In one such independent auditing transaction, the processor node 190 acts on behalf of a government entity to monitor suspicious communication activity with reports being issued to a judge in respect of the privacy rights of those being monitored. An example of such suspicious communication activity might entail the government entity providing demographic user-based and location-based rules for monitoring calls where certain terms are used (see related processing in blocks 220 of FIG. 2A and 190 of FIG. 4). Sensitive user data provided by way of the back channel data can be encrypted and delivered in various forms with a key provided to (or accessible by) the judge for decrypting before analyzing the data (e.g., in deciding whether to issue a subpoena for desensitizing the data), or by another entity for reprocessing and further monitoring within the network.

As a function of subscriber-based agreements or other authorized protocols (examples being provided herein), a memory circuit stores the above-discussed user profiles (including subscriber data such as identity, age, and other particulars and demographics) on behalf of an operator for the wireless communication network for access to the network. On behalf of a third party, the memory circuit also stores communication rules relevant to a geographic region of service provided by the communication network. The processor node is configured within the wireless-technology equipment for assimilating back channel data, such as current location data regarding the user terminals and with the user profiles, for generating assimilated current location-based and user-characterizing data. The generated data is provided to another processor node (such as at a third party). In one configuration, in response thereto, a modified set of data and a set of rules are received from the third party for generating another set of assimilated current location-based and user-characterizing data.

Various embodiments described above, in the claims that follow, in the figures and related discussion may be implemented alone, in one or more combinations with other aspects and/or in other manners. One or more of the elements depicted in the figures can also be implemented in a more separated or integrated manner, or removed, as is useful in accordance with particular applications. It is also within the spirit and scope to implement a program or code that can be stored in a machine-readable medium to permit a computer to perform one or more aspects of the approaches described above, such as those involving the storage and retrieval of data. In view of the description herein, those skilled in the art will recognize that many changes may be made thereto without departing from the spirit and scope of the present disclosure.

What is claimed is:

1. A system comprising:
a memory circuit that stores, on behalf of an operator of a wireless network, user profiles that include wireless network subscriber data for providing network access to mobile terminals associated with the wireless network subscriber data; and
a processor node in the wireless network configured to:
assimilate current location data regarding the mobile terminals with the user profiles to generate assimilated current location data;
use the assimilated current location data to provide a set of analytics data representing analytics on location-based network usage by the mobile terminals;
determine, using the analytics data, a geographical area of the wireless network that is predicted to experience an increase in demand for content data, by a plurality of mobile terminals, that will impact on available network bandwidth; and
cause the content data to be cached in a cache located in the geographical area.

2. The system of claim 1, wherein the set of analytics data includes confidential identity information from the wireless network subscriber data of the mobile terminals for management of data traffic in the wireless network.

3. The system of claim 1, wherein the set of analytics data includes location-system data traffic in the wireless network.

4. The system of claim 3, wherein the set of analytics data includes confidential identity information from the wireless network subscriber data of the mobile terminals for management of data traffic in the wireless network.

5. The system of claim 3, wherein the set of analytics data is used in the wireless network to route communications for the mobile terminals.

6. The system of claim 1, wherein the processor node is further configured to:
generate billing information for content providers.

7. The system of claim 1, wherein the processor node is further configured to:
provide content control as a function of location of a mobile terminal and of a user profile.

8. The system of claim 1, wherein the processor node is further configured to:
track usage of certain content by the mobile terminals.

9. The system of claim 1, wherein the processor node is configured to determine the geographical area by using the analytics data to assess a location common to mobile terminals in a region.

10. The system of claim 1, wherein the processor node is further configured to:
access control data representing data-delivery conditions agreed to between first and second business entities.

11. The system of claim 1, wherein the processor node is further configured to:
control, based on groups of the mobile terminals agreeing to limit access to the wireless network, at least one of: wireless network bandwidth, wireless network access, allocation of communication resources, and allocation of cache memory resources.

12. The system of claim 1, wherein the processor node is further configured to determine the geographical area based at least in part on socio-cultural factors.

13. A system comprising:
a memory circuit that stores, on behalf of an operator of a wireless network, user profiles that include wireless network subscriber data for providing network access to mobile terminals associated with the wireless network subscriber data; and
a processor node in the wireless network configured to:
assimilate current location data regarding the mobile terminals with the user profiles to generate assimilated current location data;
use the assimilated current location data to provide a set of analytics data representing analytics on location-based network usage by the mobile terminals;
determine, using the analytics data, a geographical area of the network that is experiencing an increase in demand for content data, by a plurality of mobile terminals, that will impact on available network bandwidth; and
cause the content data to be cached in a cache located in the geographical area.

14. The system of claim 13, wherein the processor node is further configured to determine the geographical area based on one or more additional parameters including at least one of: user data, device characteristics, network characteristics, environmental factors and socio-cultural factors.

15. The system of claim 13, wherein the set of analytics data includes confidential identity information from the wireless network subscriber data of the mobile terminals for management of data traffic in the wireless network.

16. The system of claim 13, wherein the set of analytics data includes location-system data traffic in the wireless network.

17. The system of claim 16, wherein the set of analytics data includes confidential identity information from the wireless network subscriber data of the mobile terminals for management of data traffic in the wireless network.

18. The system of claim 16, wherein the set of analytics data is used in the wireless network to route communications for the mobile terminals.

19. The system of claim 13, wherein the processor node is further configured to:
generate billing information for content providers.

20. The system of claim 13, wherein the processor node is further configured to:
provide content control as a function of location of a mobile terminal and of a user profile.

21. The system of claim 13, wherein the processor node is further configured to:
track usage of certain content by the mobile terminals.

22. The system of claim 13, wherein the processor node is configured to determine the geographical area by using the analytics data to assess a location common to mobile terminals in a region.

23. The system of claim 13, wherein the processor node is further configured to:
access control data representing data-delivery conditions agreed to between first and second business entities.

24. The system of claim 13, wherein the processor node is further configured to:
control, based on groups of the mobile terminals agreeing to limit access to the wireless network, at least one of: wireless network bandwidth, wireless network access, allocation of communication resources, and allocation of cache memory resources.

* * * * *